Patented May 30, 1950

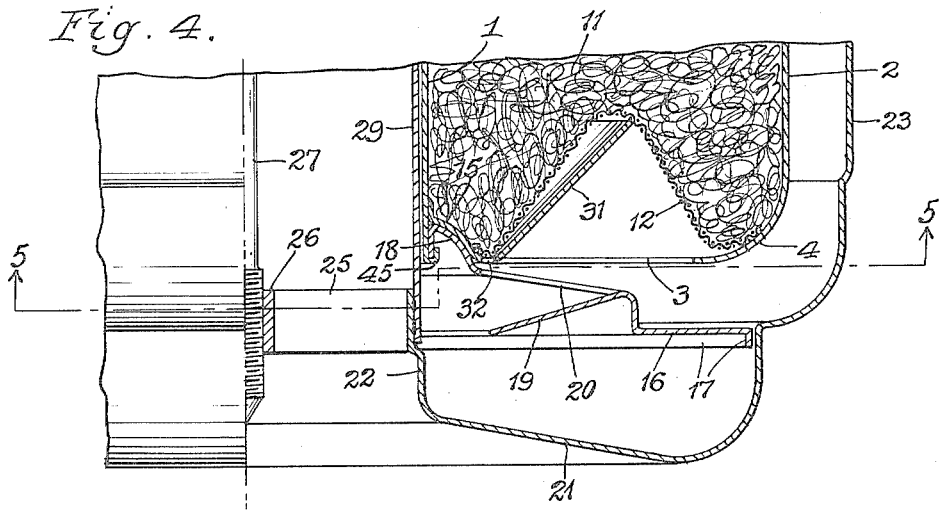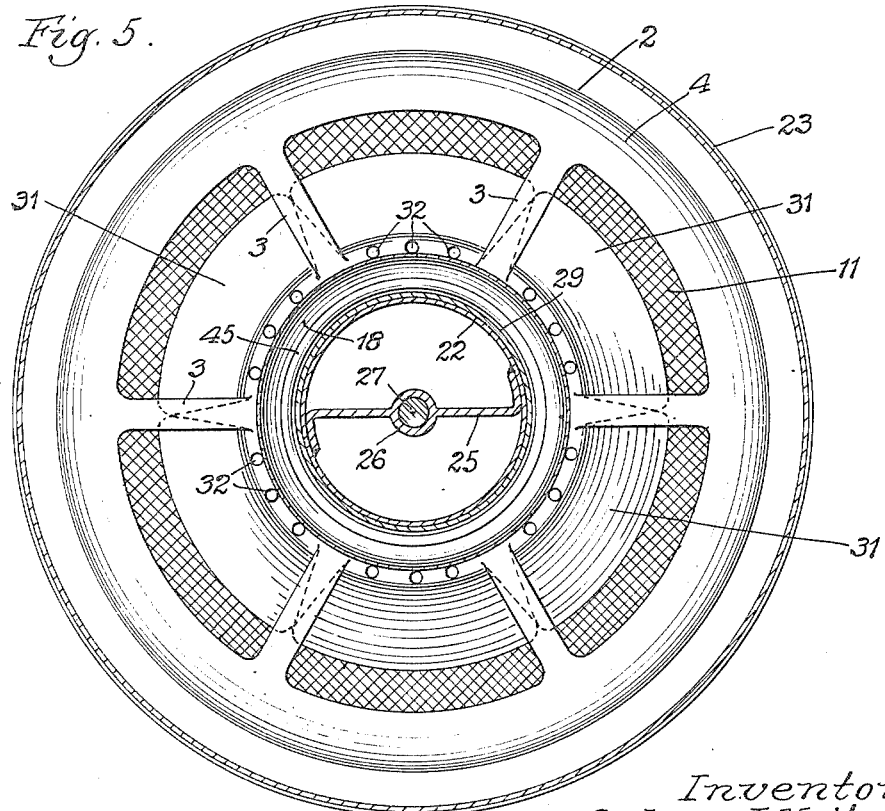

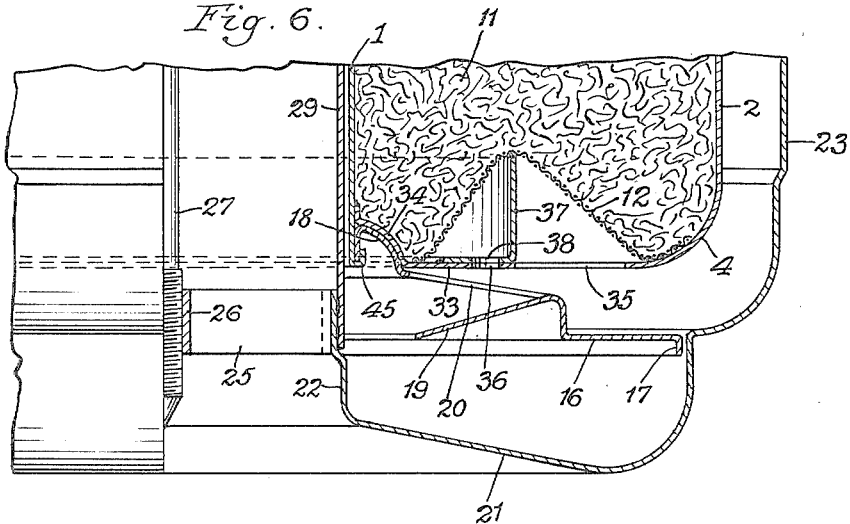

2,509,802

UNITED STATES PATENT OFFICE 2,509,802

CLEANER CONSTRUCTION

Mark L. Blair, Flossmoor, and Andrew J. Heitzmann, Chicago, Ill., assignors to United Specialties Company, Chicago, Ill., a corporation of Delaware Application December 29, 1945, Serial No. 638,330

5 Claims. (Cl. 183—15)

This invention relates to an air cleaner and particularly to a baffle construction for use in an oil bath or liquid type cleaner.

It has for one object to provide means for directing the flow of liquid through the cleaner in a manner which will produce effective cleaning and for preventing oil "pull over" and for accomplishing oil retention.

Another object is provide a baffle construction so arranged as to provide a substantial and sudden expansion in the stream of air which moves through the cleaner and hence to improve cleaning.

Another object is to provide means for directing the air to and within the filter mass so as to accomplish the most efficient cleaning.

Other objects will appear from time to time in the course of the specification and claims.

The invention is illustrated more or less diagrammatically in the accompanying drawings, wherein:

Figure 4 is a view similar to Figure 1 with parts omitted and illustrating a modified form of the device;

Figure 5 is a bottom plan view of the device shown in Figure 4; and

Figures 6 and 7 are similar to Figure 4 and illustrate further modified forms.

Like parts are indicated by like symbols throughout the specification and drawings.

Figure 2:
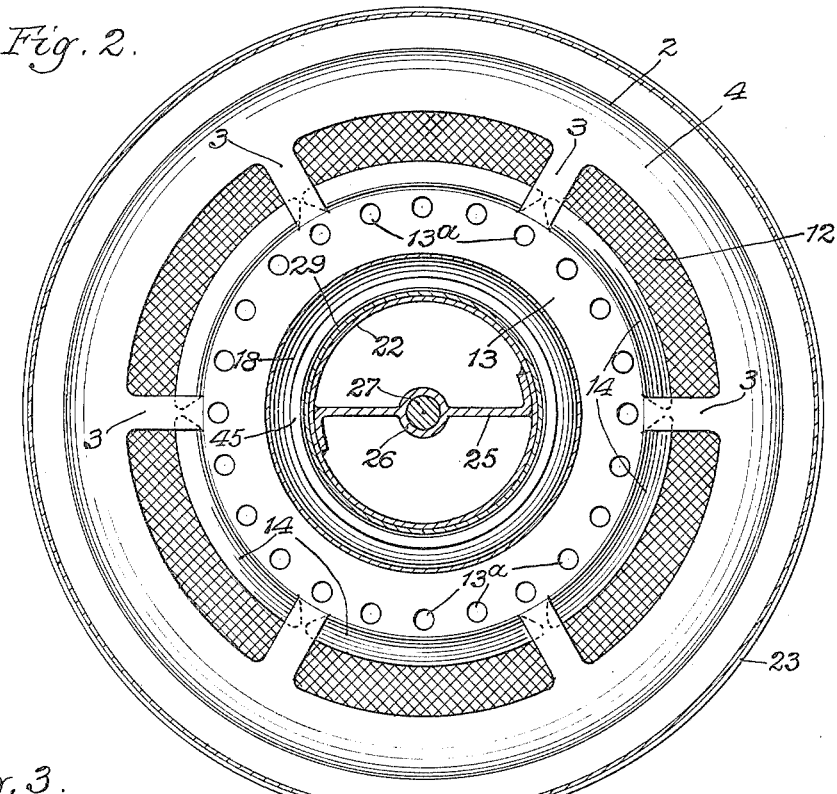
Figure 2 is a section taken at line 2—2 of Figure 1.
Figure 3:
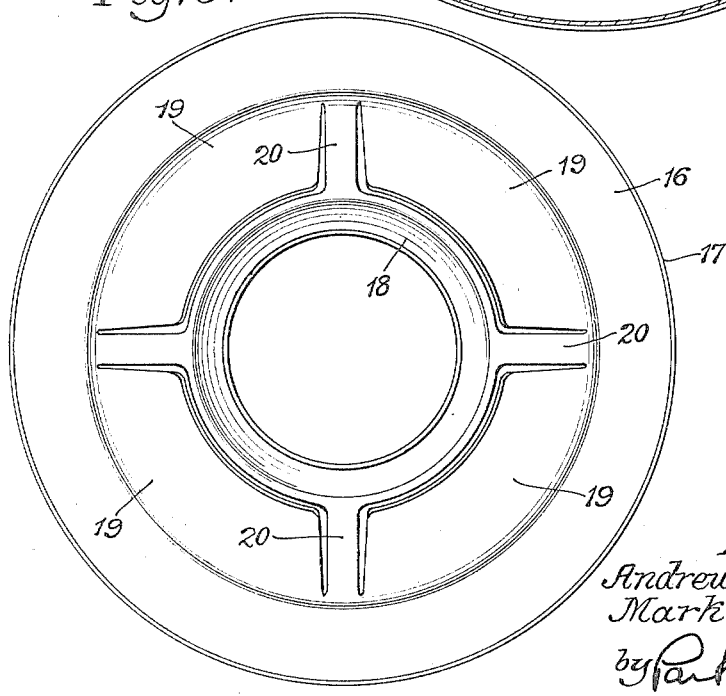
Figure 3 is a plan view of the baffle seen from its under side.

In the particular form here shown the invention is applied to an air cleaner having an outside annular inlet and a central downward discharge tube. The invention however is not limited to this particular association and might be applied to other types of cleaners. The cleaner shown will be described only sufficiently to indicate the use and application of the present invention. As shown the cleaner comprises two main sections, the filter section and an oil cup section. The filter section comprises an inner more or less tubular member 1 and an outer annular member 2. These members are joined at their lower ends by parts which extend between them. These include arms 3. The arms are preferably relatively narrow as shown in Figure 2 and provide substantial clear space through which upwardly moving air or gas may pass. A portion 4 which is preferably integral with the annular portion 2 and is curved as shown in Figure 2 to provide a guiding or baffle means for the incoming air is also provided. A cover member 5 extends across the filter section of the cleaner and is engaged by the outwardly directed flange 6 of the member 2 by being bent over that flange as at 7. An air guiding and liquid retaining baffle 8 is positioned on the upper end of the member 1 and secured to the member and extends partly over the space defined between the members 1 and 2. A spider 9 may be secured to or made integrally with the member 8.

A screen 10 is positioned adjacent the upper end of the space defined between the members 1 and 2 and serves to retain a filter mass 11. The filter mass is retained and supported at its lower end by a screen 12.

At the lower portion of the filter mass a baffle is provided. As shown this baffle includes a relatively horizontal portion 13, perforated as at 13a, and an upwardly and outwardly bent portion 14. The portion 13 may be curved, as at 15, if desired, to provide an engaging space for a baffle. This baffle includes a disc-like portion 16 which may have a downwardly turned flange 17. At its inner edge the baffle is perforated and is provided with a curved portion 18 which fits against and corresponds in shape to the shape of the curved portion 15. The baffle is provided with downwardly directed members 19 and the portions 18 and 19 are joined by arms 20.

The lower or liquid containing portion of the cleaner includes an annular cup-like member having a bottom 21 and an inner side 22 and an outer side 23. An annular air inlet is provided, as at 24, between the members 2 and 23. A bridge 25 is positioned in the portion 22 and carries a central threaded portion 26. An attaching screw 27 is adapted to be received and engaged in the portion 26. It passes through a suitable opening in the cover 5 and is provided with a thumb nut 28 by means of which it may be rotated into tight engagement with the member 26. The portion 22 of the cup may be provided with an upwardly standing inlet pipe 29 which fits within and may contact the housing portion 1.

Within the space defined between the members 1 and 2 and the screens 10 and 12 is a filter mass 11 which may be of metal wool or synthetic or vegetable or animal fibers.

In the modified form of the device as shown in Figures 4 and 5 the structure is the same as that described with one exception. The baffle in the lower portion of the filter section extends substantially upwardly without any horizontal portion. Thus instead of the horizontal portion 13 and the upwardly extending portion 14 there is provided an upwardly and outwardly directed portion 31. Perforations 32 may or may not be provided as shown in Figure 4 and, if desired, corresponding perforations might be shown in the form of the earlier figures.

The modified form of Figure 6 is generally similar to that illustrated in Figure 4, except that instead of the member 31, which is formed as shown in Figure 4, integrally with the portion 15, the cleaner housing section 2 is provided with the flat portion 33 which includes an upwardly curved portion 34, which is itself secured by welding or otherwise to the member 1.

The member 33 is provided with a number of openings 35 and with a number of perforations 36. A cup-like member 37 is secured to the member 33 and is perforated, as at 38. These perforations register with the perforations 36. The form of Figure 6 therefore differs from the form of Figure 5 mainly by the fact that the walls of the cup-like member 37 are vertical instead of being inclined, as is the wall 31 of Figure 4.

In the modified form of Figure 7 the member 2 is provided with an upwardly directed portion 39 which is cut out to provide openings 40 and legs 41. Integral with the member 39 is a flat imperforate portion 42 provided with a downwardly depending flange 43 which is fixed to the tubular member 1. A screen section 44 extends from the portion 39 to the portion 2.

Figure 1:
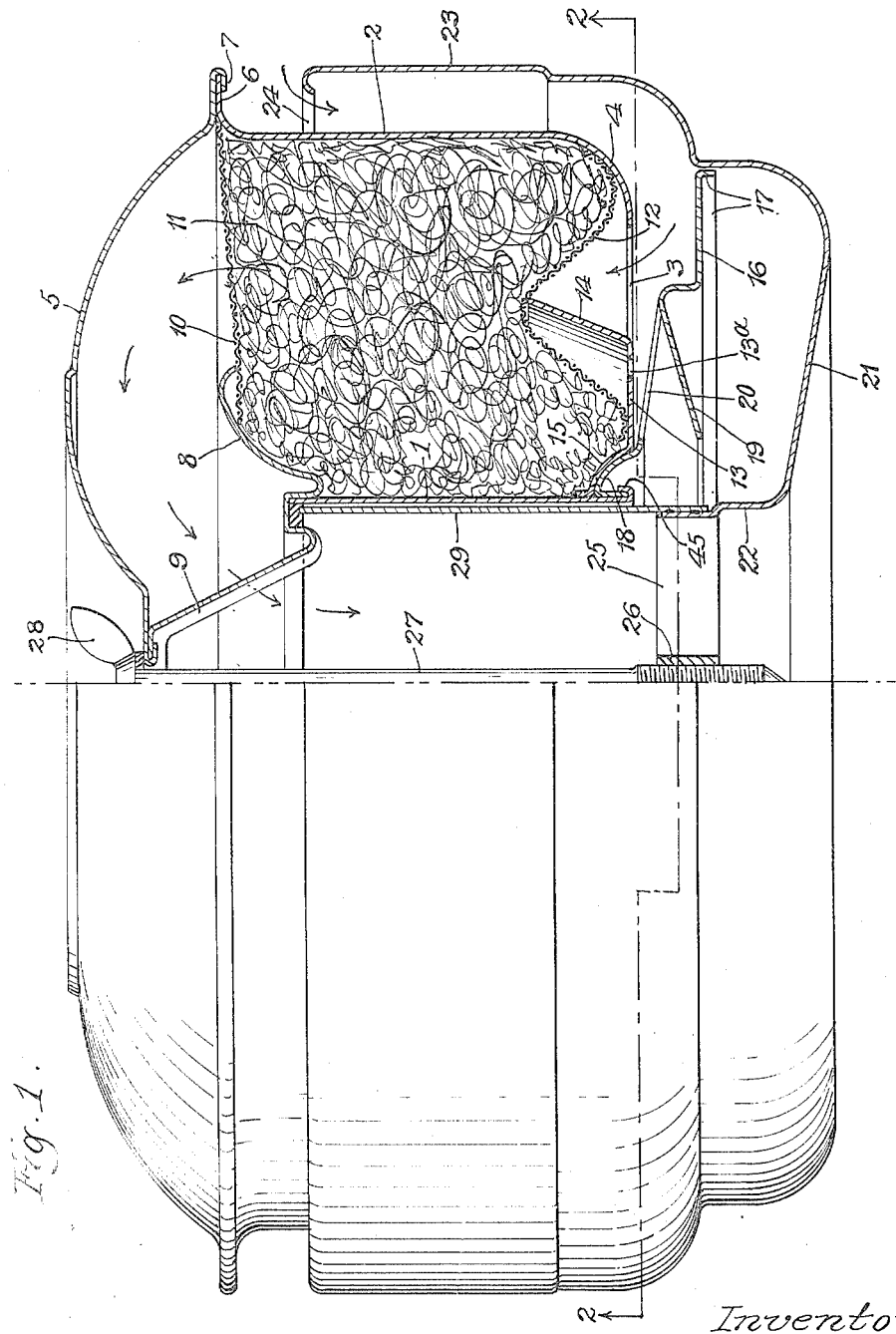
Figure 1 is a side elevation with parts in section showing one form of cleaner to which the baffle of the present invention may be applied.

The invention is not limited to the particular details by means of which the various structural parts are fastened together. In the several Figures 1, 4, 6 and 7 a tubular member 1 is provided with an upwardly directed annular member 45 which engages the baffle portions and portions of the assembly generally. Thus as shown in Figure 1 the member 45 engages a downwardly bent portion of the member 18. The same is true in the structure of Figure 4. In Figure 6 the member 45 engages a downwardly bent portion of the baffle 18, which is the same as the baffle shown in Figures 1 and 4. The same construction in respect to this detail appears in Figure 7. The tubular member 1, as shown in Figure 7, may be provided with an outwardly extending bead 46 which serves to space and position the baffle 18 and the flange 43 of the member 42.

It will be realized that whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

Experience has shown that air passing through a cleaner of the general type shown will tend to rise toward the center of the cleaner and that the outer or peripheral portions of the filter mass will be used less than the inner or central portions. This produces irregular and unsatisfactory cleaning and produces an irregular and relatively uncontrolled flow of air through the cleaner. The baffle 14 or the baffle 31 controls this flow of air by forcing the air as it rises from the oil cup to move toward the outer portion of the filter mass.

Another advantage occurs from this construction, however. As the air moves upwardly through the relatively restricted space defined by the inner upper edge of the baffle 14 or 31 and the inner edge of the curved portion 4, it moves through a somewhat restricted path. As soon as the air has passed the upper edge of the baffle 14 or 31 its path is greatly enlarged and hence its velocity is greatly reduced.

Thus the tendency of the air to drop foreign matter and oil which it has carried thus far is greatly augmented by the presence of baffles such as the baffles 14 and 31. Experience with the device of this invention has shown that a large portion of the foreign matter and oil carried by the air is dropped in this general zone of expansion as the air passes slightly beyond the upper edge of the baffle 14 or 31. The liquid tends to drain backwardly down through the filter mass and on the inner side of the baffle 14 or 31.

Openings are provided in these baffles through which oil may drain backwardly into the cup. These openings are provided in line with the arms which extend transversely across the baffle structure such as the arms 3, and there will be one opening in the baffle for each arm. If desired, additional openings may be provided as shown particularly in Figures 4 and 5.

We claim:

1. In an air cleaner, inner and outer casing members defining a substantially annular filter housing open at its opposite ends, a quantity of filter material positioned between said members within said housing, a cover for said cleaner, means defining an air outlet passage for said cleaner, a third casing member defining with said outer casing member an annular air inlet passage to the cleaner surrounding said annular housing and a liquid cup disposed in spaced relation to and beneath said housing, said third casing member, said liquid cup, said inner and outer casing members, and said cover member cooperating to define a continuous air flow passage leading from said intake passage to said outlet passage and including a portion through which the air flows upwardly through said filter material, and a fixed baffle member carried by said housing and extending outwardly and upwardly from said inner casing member at a point above the level of liquid in said cup and including an annular portion disposed in the path of incoming air and engaging the filter material intermediate said inner and outer casing members to direct the upwardly flowing air through that portion of the filter material lying between the point of engagement of said baffle with said filter material and said outer casing member.

2. The air cleaner described in claim 1 wherein a second baffle member separate from said first baffle member is provided, said second baffle member being disposed within said cup, and in spaced relation to said first-mentioned baffle member.

3. The air cleaner described in claim 2 wherein means are provided for removably mounting said second baffle member within said cup.

4. The air cleaner described in claim 1 wherein said annular portion of said baffle member penetrates into the body of filter material to substantially mask off that portion of the filter material lying above the baffle member and adjacent to said inner casing member.

5. The air cleaner described in claim 1 wherein said baffle member, intermediate its outer periphery and said inner casing member, is provided with perforations communicating with the filter material lying thereabove and adjacent to said inner casing member.

MARK L. BLAIR.
ANDREW J. HEITZMANN.

REFERENCES CITED

The following references are of record in the file of this patent:

UNITED STATES PATENTS

| Number | Name | Date |
|---|---|---|
| 2,015,174 | Anglemyer | Sept. 24, 1935 |
| 2,150,745 | Mieras | Mar. 14, 1939 |
| 2,168,670 | Evans | Aug. 8, 1939 |
| 2,171,752 | Kamrath | Sept. 5, 1939 |
| 2,240,042 | Kelsey et al. | Apr. 29, 1941 |
| 2,287,806 | Kamrath | June 30, 1942 |
| 2,304,829 | Kamrath | Dec. 15, 1942 |
| 2,341,771 | Hogar | Feb. 15, 1944 |